No. 706,981. Patented Aug. 12, 1902.
E. MASSEY.
APPARATUS FOR HARVESTING POTATOES.
(Application filed Feb. 14, 1900.)
(No Model.) 3 Sheets—Sheet 1.
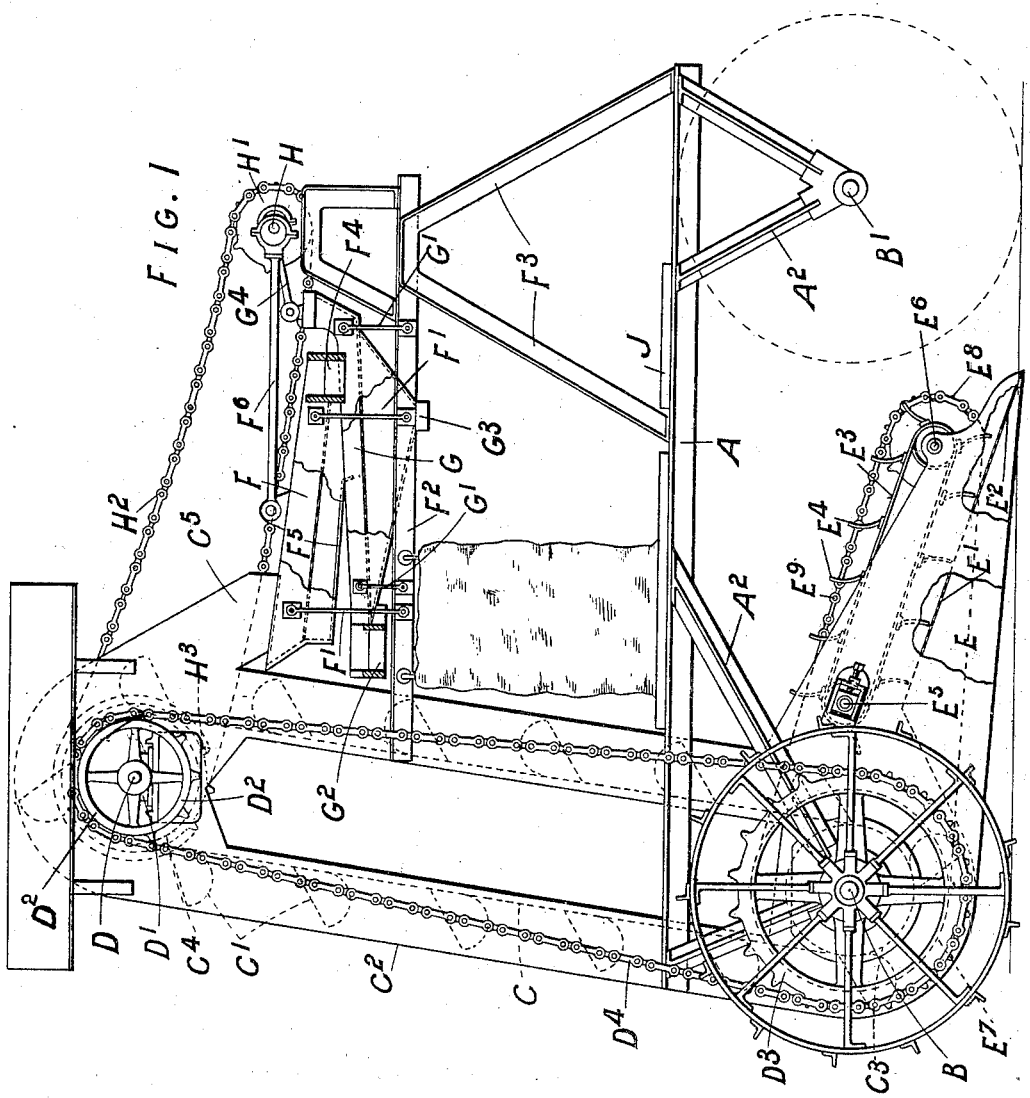
Witnesses:
H. A. Knight,
S. E. Lamb.
Inventor,
Edward Massey
By Knight Bros
Attys.

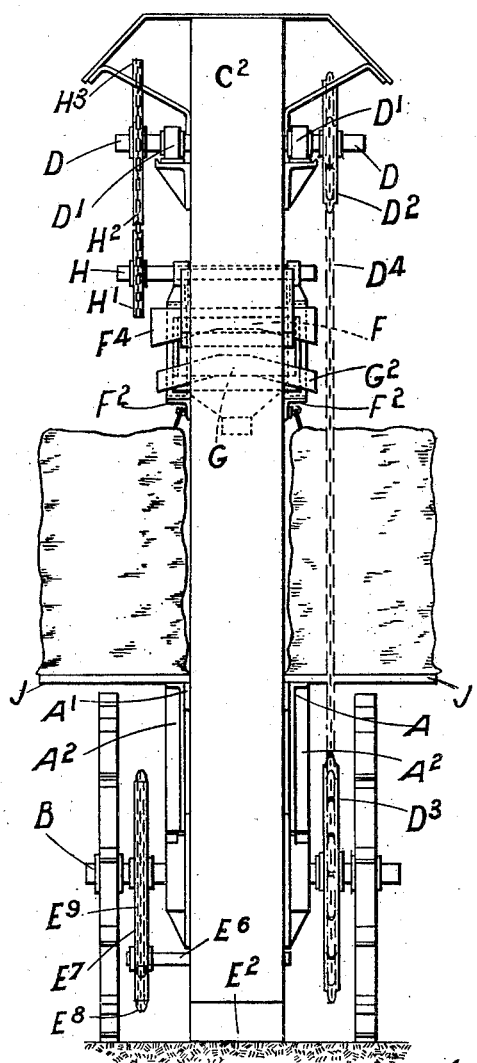

No. 706,981. Patented Aug. 12, 1902.
E. MASSEY.
APPARATUS FOR HARVESTING POTATOES.
(Application filed Feb. 14, 1900.)
(No Model.) 3 Sheets—Sheet 3.
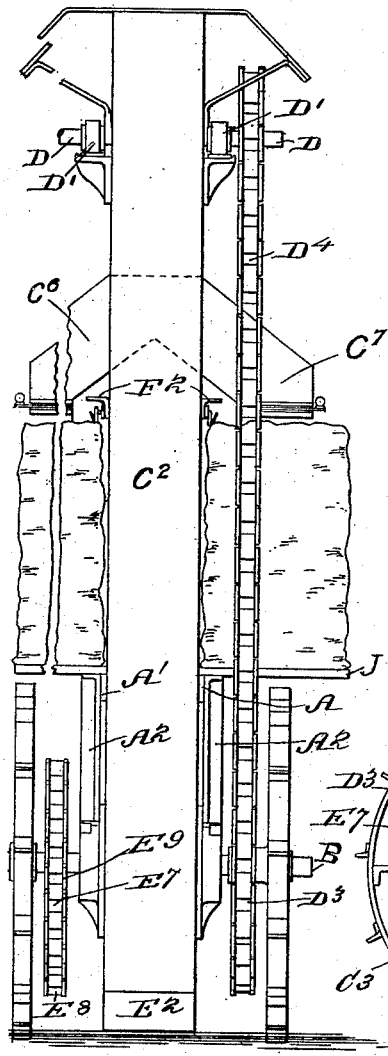
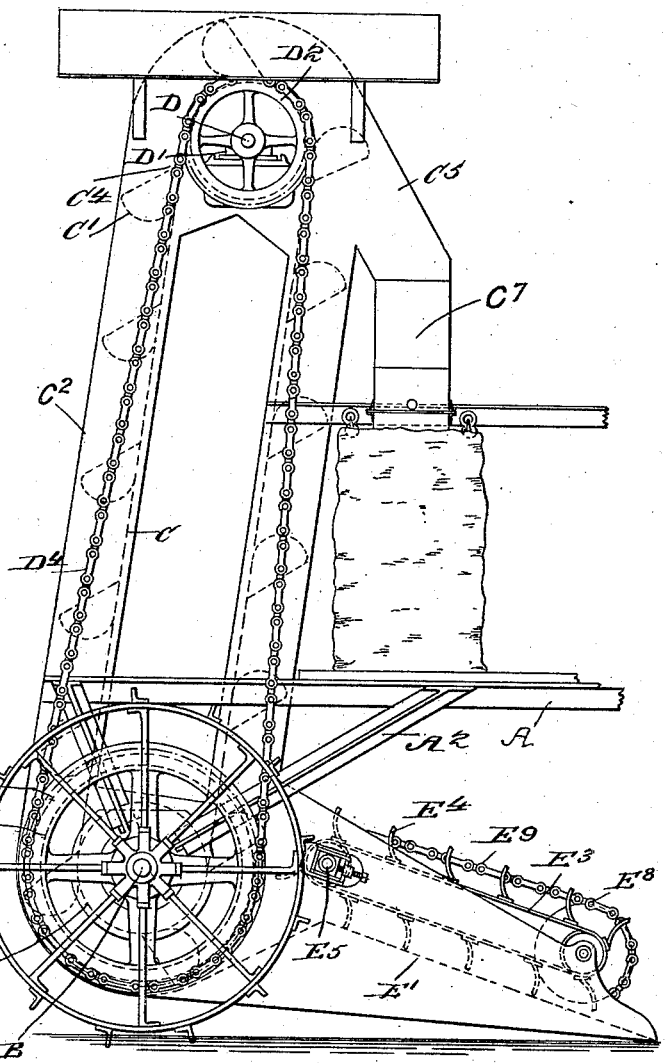

UNITED STATES PATENT OFFICE.

EDWARD MASSEY, OF HOLMES CHAPEL, ENGLAND.

APPARATUS FOR HARVESTING POTATOES.

SPECIFICATION forming part of Letters Patent No. 706,981, dated August 12, 1902.

Application filed February 14, 1900. Serial No. 5,190. (No model.)

*To all whom it may concern:*

Be it known that I, EDWARD MASSEY, a subject of the Queen of England, residing at Holmes Chapel, county of Chester, England, have invented certain new and useful Improvements in or Relating to an Apparatus for Harvesting Potatoes, (for which application has been made in Great Britain under No. 16,434, dated August 12, 1899,) of which the following is a specification.

This invention relates to apparatus for digging, sorting, and sacking potatoes capable of being grown in "drills" or ridges of the ground.

According to this invention the apparatus is drawn over the land by horses or is propelled by steam-power or otherwise along the drills or ridges in which potatoes, for instance, grow.

The apparatus comprises a device which removes the upper portion of the drill or ridge and a sieve or sieves for sifting out the potatoes from the earth in which they are contained. From the sieves the potatoes pass on to sorting-grids, which grade them into assorted sizes. Delivery chutes or spouts extend from these grading-grids to a platform, upon which sacks are supported beneath the mouths of the chutes or spouts. The sieves or grids may be vibrated or jogged automatically or otherwise, as desired. Conveyers can be employed to convey the earth and potatoes from one part to another in the apparatus. These, together with the sieve-operating gear, if such be employed, may be operatively connected either to the wheels upon which the apparatus travels or to separate driving apparatus operated manually or mechanically, as may be convenient. The apparatus is provided with rotary or other means of known construction for removing the halms.

The road-wheels of the apparatus may be provided with projections which will prevent them from slipping as they travel, and they may be provided with extra-wide rims for use on very light soils.

If desired, the sorting grids or sieves may be dispensed with and the potatoes carried directly from the sieve employed for separating the potatoes from earth into sacks or other receptacles.

In the accompanying drawings, Figure 1 is a side, and Fig. 2 an end, elevation, respectively, of an apparatus constructed according to this invention. Figs. 3 and 4 are similar views of such an apparatus without the sorting-grids.

Like letters indicate like parts in all the figures.

The apparatus is carried on a four-wheeled carriage, the frame of which consists of two side pieces A A', conveniently formed of bars of angle-iron, on which are secured depending bars $A^2$ to carry the bearings for the axles B B' of the road-wheels. Between the rear road-wheels is a vertical conveyer, consisting of an endless band C, with buckets C' within a casing $C^2$, secured on the frame of the carriage. The endless band C is carried on two drums or wheels, the bottom one, $C^3$, running idly on the road-wheel axle. The upper one, $C^4$, provided with cogs or the like to give travel to the endless band, is fixed on a shaft D, carried in bearings D' on the casing $C^2$. The shaft D is operated from the road-wheel axle through gear-wheels $D^2$ $D^3$ and chain $D^4$. The bottom of the casing $C^2$ is open in front and is provided with a forward extension E. The bottom of the extension consists of an inclined sieve E', terminating in front in a plate or blade $E^2$, arranged to cut off and receive the upper portion of the drill or ridge. Within the extension E is a traveling band $E^3$, with curved blades $E^4$ occupying the whole width of the extension E. The traveling band is carried on drums secured on short shafts $E^5$ $E^6$, borne in bearings on the sides of the extension E, and is operated from the axle B of the road-wheels by gear-wheels $E^7$ $E^8$ and chain $E^9$. The front of the casing $C^2$ is provided near the top with a delivery-spout $C^5$. Beneath the delivery-spout is placed a sieve or grid F. This sieve is carried on vertical rods F', the upper ends of which are pivotally connected to the sides of the sieve, while their lower ends are similarly connected to side bars $F^2$, secured to the elevator-casing and to uprights $F^3$, carried on the main frame of the apparatus. The sieve F is arranged with a slight incline, its higher end being placed under the delivery-spout $C^5$. Its lower end is provided with a projecting delivery-spout $F^4$, one at each side. Beneath a portion of the mesh of the sieve a solid bottom F⁵ is provided to direct the material falling through the mesh toward one end of a second sieve G, placed below the sieve F and carried on the side bars F² on pivoted rods G' in a similar manner to that sieve. The sieve G is also arranged with a slight incline and its lower end provided with a projecting delivery-spout G², one on each side. Beneath the mesh of the sieve G a funnel-shaped bottom ending in a delivery-spout G³ may be provided. Means are provided for reciprocating each of the sieves F and G. This may be arranged to be worked by hand. Preferably it is operated, as shown in Figs. 1 and 2, by means of eccentrics and rods F⁶ G⁴, respectively carried on a shaft H. A wheel H' on the said shaft is geared by a belt or chain H² with a wheel H³ on the shaft D, which, as before described, is rotated from the road-wheels of the apparatus.

A platform J is provided on each side of the apparatus, being supported on the frame-bars A A', respectively, and on these platforms the sacks to receive the potatoes are placed. The sacks may be held in position by hooks on the side bars F² and are placed under the spouts of the sieves F and G. In the figures, however, for the sake of clearness no sacks are shown under the spouts F⁴.

A rotary or other device is arranged above and slightly in advance of the plate E² to cut or knock off the halms; but as such devices are well known and form no part of this invention they need not be described and are not shown in the drawings.

The operation of the apparatus is as follows: As the vehicle is propelled over the field the plate E² cuts into and removes the upper part of the drill or ridge, when the potatoes and earth together are caught by the blades E⁴ of the conveyer and carried over the inclined sieve E', during which process the greater portion of the earth will be separated from the potatoes and fall back onto the field. From E' the potatoes fall into the bottom of the casing C², are carried up by the conveyer-buckets C', and discharged through the spout C⁵ onto the sieve F. The mesh of this sieve is of such a size as to retain only the larger-sized potatoes, and these are carried forward by the motion of the sieve (owing to its inclined position) and discharged through the spouts F⁴. The smaller potatoes and any dirt fall through the meshes of the sieve F onto the sieve G. The mesh of this sieve is of a size to retain all marketable potatoes which are discharged through the spouts G², dirt, small stones, and other refuse being thrown back onto the field through the spout G³.

It is obvious that only one sieve may be employed or more than two, according as it is desired to grade the potatoes, or the grading-sieves may be dispensed with. Such a construction is shown in Figs. 3 and 4. In place of the spout C⁵ two delivery-spouts C⁶ C⁷ are provided, and the potatoes are delivered directly from the conveyer into the sacks.

Although automatic apparatus is described for giving motion to the sorting-grids, it is evident that these might be moved by hand, or they might be fixed solidly on the frame and the jolting of the carriage relied on to give the requisite motion to their contents.

Although the arrangement of grading-sieves shown and described is what I prefer, it is evident that this construction may be varied without departing from the spirit of the invention.

What I claim as my invention, and desire to secure by Letters Patent, is—

In a potato-digger, the combination with a traveling carriage having a main frame, of a digging-blade, an inclined sieve receiving the earth dug up by the digging-blade, a conveyer for conveying the potatoes over the said sieve, all placed beneath said frame, of a second conveyer centrally located within said frame and extending from a point below to a point above said frame, of platforms on said frame, above and at each side thereof, a grading apparatus carried on brackets above said platforms and having delivery-spouts leading to convenient receptacles carried by said platforms, an eccentric device for vibrating said grading apparatus, said second conveyer adapted to convey the potatoes delivered by said first conveyer, to said grading device, and suitable chain mechanism operated by the wheels of the carriage for independently operating said conveyers and said eccentric device.

In testimony whereof I have signed my name to this specification in the presence of two subscribing witnesses.

EDWARD MASSEY.

Witnesses:
 THOMAS WILD MARKLAND,
 ARTHUR G. LUNT.